United States Patent [19]

Lee

[11] 4,262,898
[45] Apr. 21, 1981

[54] HAND EXERCISER HAVING A COUNTER

[76] Inventor: Haa W. Lee, 311-78 Mia-dong, Dobong-Ku, Seoul, Rep. of Korea

[21] Appl. No.: 62,577

[22] Filed: Jul. 31, 1979

[51] Int. Cl.³ .............................................. A63B 21/30
[52] U.S. Cl. ................................ 272/68; 272/DIG. 5; 272/140; 235/117 A
[58] Field of Search .................... 272/67, 68, DIG. 5, 272/140, 136, 137, 135; 235/103, 117 R, 117 A, 123

[56] References Cited

U.S. PATENT DOCUMENTS

| | | | |
|---|---|---|---|
| 932,331 | 8/1909 | Russell | 235/117 R |
| 2,806,699 | 9/1957 | Spooner | 272/140 |
| 3,002,687 | 10/1961 | Herr | 235/117 R |
| 3,807,729 | 4/1974 | Sigma | 272/68 |

FOREIGN PATENT DOCUMENTS 1255343 12/1971 United Kingdom ............... 235/117 A

*Primary Examiner*—Richard J. Johnson
*Attorney, Agent, or Firm*—Wenderoth, Lind & Ponack

[57] ABSTRACT

A hand exerciser equipped with a counter in one of two lever arms, wherein the counter is made up of two wheels interconnected by a reducing wheel combination whereby a second wheel is rotated an increment of one for every full rotation of the first wheel which in turn is rotated by an increment of one by a pawl and ratchet device upon contact of one lever arm of the hand exerciser with the other lever arm.

1 Claim, 5 Drawing Figures

HAND EXERCISER HAVING A COUNTER

BACKGROUND OF THE INVENTION

The present invention relates to a new hand exerciser equipped with a counter.

It is well known to provide a hand exerciser including a coil spring, both ends of which are connected to a pair of handles. By repetitively squeezing and releasing the two handles of the exerciser by hand the grasping power of the hand can be increased. In using these devices however, it is very easy to lose count of the number of repeats performed and as a result of which the user very quickly looses interest in the exercise.

OBJECT OF THE INVENTION

The object of the present invention is to provide a new hand exerciser with which the user can confirm the number of repeats he has done with his hand and as a result maintain his interest in the exercise.

SUMMARY OF THE INVENTION

According to the present invention, one of the handles of the hand exerciser has a counter so that when both handles of the exerciser are brought into contact with each other due to the grasping movement of the hand the number of the counter is increased. The user can identify the number of repeats completed in a set time and the resulting ability to focus on the specifics of the exercise regimen thereby increases the ability to maintain an interest in the exercise.

BRIEF DESCRIPTION OF THE DRAWINGS

The invention will be described in greater detail in connection with the accompanying drawings in which.

DETAILED DESCRIPTION OF THE PREFERRED EMBODIMENT

Figure 1:
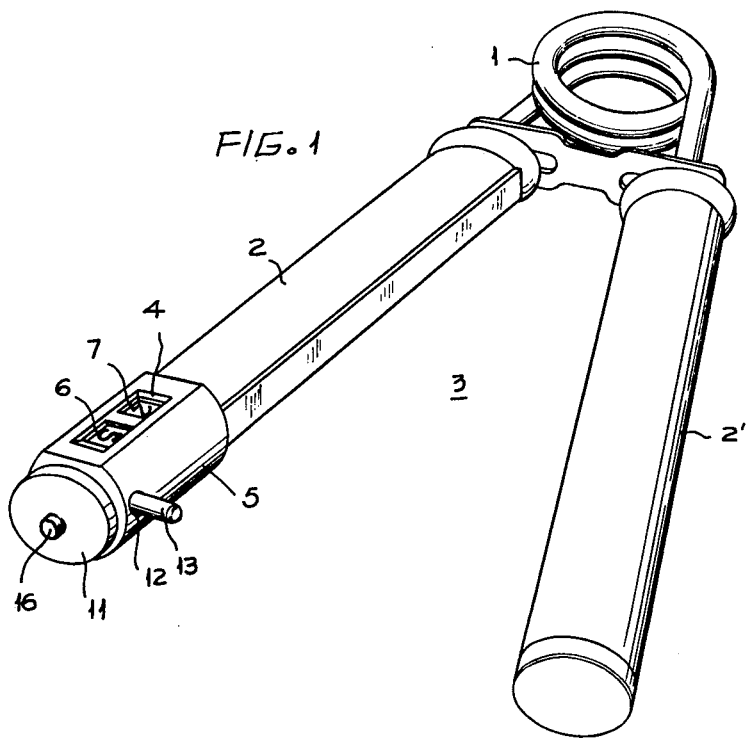
FIG. 1 is a perspective view of the exerciser of the invention.
Figure 2:
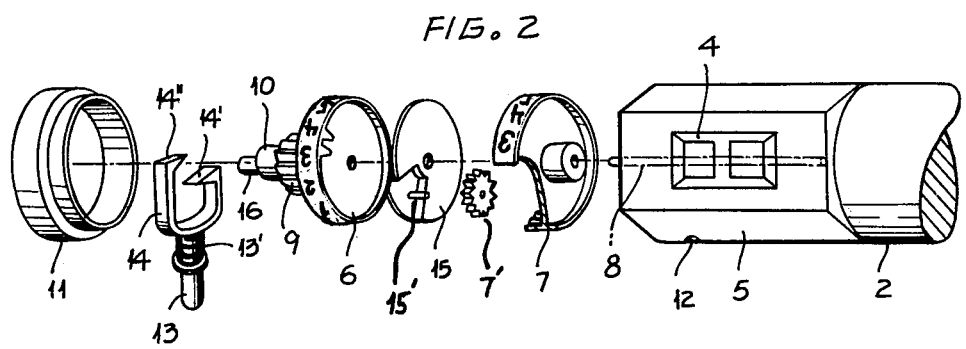
FIG. 2 is an exploded view of the counter which is installed in one of the handles of the exerciser of the present invention.
Figure 4A:
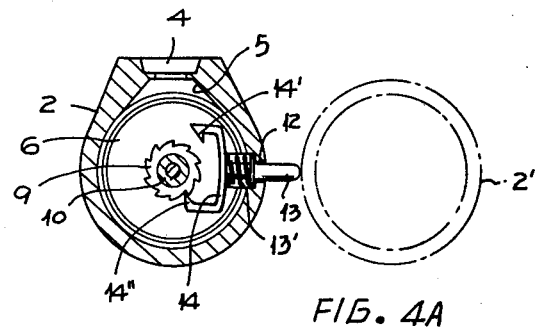
FIGS. 4a–4b are sectional views of the counter illustrating how the number displayed on the counter is increased.
Figure 4B:
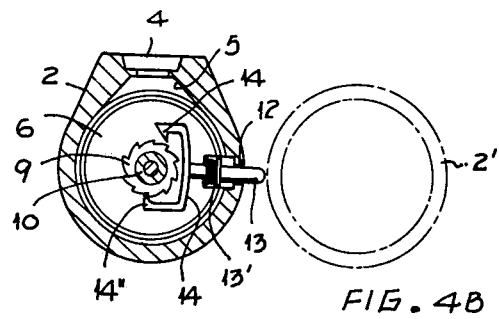
Figure 3:
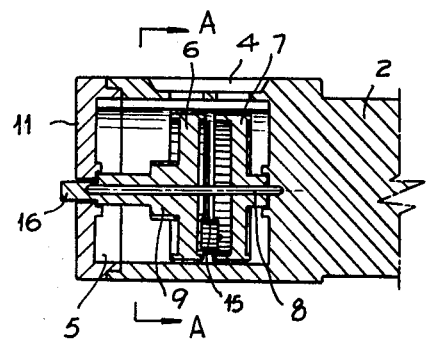
FIG. 3 is a cross-sectional view of the counter.

Referring to FIG. 1, the hand exerciser 3 consists of a coil spring 1 attached to two handles 2 and 2', with a counter 5 having an indicator 4 mounted in a recess in the end of handle 2.

The counter 5 contains a unit dial 6 and a tens dial 7, the combination of which is based on the decimal system but not necessarily limited to such. The tens dial 7 is turned by engagement with a toothed reducing wheel 7' which is mounted on a pin mount 15' which extends from a recessed portion of an indexing disc 15. The indexing disc 15, unit dial 6 and tens dial 7 are rotatably mounted at their axes on a rod 8 which is held in place by a hub 16 which extends through a rear cap 11 which closes the end of the recess in handle 2.

The unit dial 6 is located adjacent and connected to a tooth ratchet wheel 9 which is engaged by a pawl member 14 for turning the toothed ratchet wheel 9. The pawl member 14 has a pair of pawls 14' and 14" mounted on the ends of a U-shaped member, and a pin 13 extending from the base of the U-shaped member. The coil spring 13' forces the pin 13 outwardly as a result of the elastic force of the coil spring 13'.

The button 13 is located in a position on the counter 5 wherein it passes through a hole 12 in the counter and faces the other handle 2' of the hand exerciser.

According to the above described invention, the elements combine to operate as follows:

The user grasps the device at both handles 2 and 2' and commences the squeezing and releasing movement. As both handles 2 and 2' are touched to each other, the handle 2' pushes the button 13 inwardly thereby activating the pawl member 14 which turns the toothed ratchet wheel 9 by engagement with the pawls 14' and 14". The unit dial 6 is turned gradually one by one causing the indexing disc to turn. As the unit dial completes one full cycle of rotation along with the indexing disc 15, the toothed reducing wheel 7' engages with the tens dial 7 by an increment of one for every full rotation of the indexing disc 15.

As the exercise is performed, the exact number of repeats is displayed on the indicator and thereby allowing the user to keep track of the number of repeats completed.

At the end of the exercise period the user can return the numbers displayed on the counter to zero by rotating the hub 16 by hand until the number indicator is at zero and thereby place the hand exerciser in condition for the start of a new set of repeats.

What is claimed is:

1. A hand exerciser with a counter comprising, a spring means, a pair of handles, each having one end mounted on said spring means for having the other end of each said handles urged away from each other by said spring means, and counter means, mounted on one of said handles and engageable by the other of said handles when each said handles are moved together, for indicating the number of times said handles are brought into contact with each other, said counter means comprising:

support rod means mounted in an axial direction in a hollow portion of one of said handles and supported at one end thereof by a solid portion of said one of said handles;

a unit dial axially mounted on said rod support means;

a tens dial axially mounted adjacent to said unit dial on said rod support means;

an indexing dial axially mounted between said unit dial and said tens dial on said rod support means and secured to said unit dial for turning as said unit dial is turned;

a reducing wheel rotatably mounted on a mounting portion of said indexing dial adjacent the periphery thereof for engagement with said tens dial for turning said tens dial by an increment of one for each complete rotation of said indexing dial;

a toothed ratchet wheel axially mounted on said rod support means on the side of said unit dial opposite to the side where said indexing dial is located and secured to said unit dial for turning said unit dial;

pawl means having pawls for engaging and turning said toothed ratchet wheel;

a pin attached to said pawl means and extending outwardly through an opening in said one of said handles for being contacted by the other of said handles when said handles are brought together for causing said pawl means to turn said toothed ratchet wheel when said pin is contacted by the other of said handles; and return hub means located outside the end wall of said one of said handles for holding the other end of said rod support means in position and for returning said unit dial and said tens dial to their starting positions.

* * * * *